(12) United States Patent
Hirooka

(10) Patent No.: US 6,175,426 B1
(45) Date of Patent: Jan. 16, 2001

(54) PRINTING APPARATUS AND PRINT CONTROL METHOD

(75) Inventor: Shigeki Hirooka, Kawasaki (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/014,769

(22) Filed: Jan. 28, 1998

(30) Foreign Application Priority Data

Jan. 31, 1997 (JP) ..................................... 9-019383

(51) Int. Cl.[7] .................................... G06K 15/00

(52) U.S. Cl. .......................... 358/1.9; 358/1.16

(58) Field of Search ..................... 395/101, 109, 395/111–114, 116, 115, 106; 358/404, 444, 467, 468, 434–442, 261.4, 461, 463; 345/508, 511, 516, 520, 521, 526; 347/1–3, 14, 142, 5; 382/298, 233, 234, 239, 303; 399/1, 43, 130, 145; 400/61, 76

(56) References Cited

U.S. PATENT DOCUMENTS 5,764,863 * 6/1998 Fall et al. .............................. 395/112

* cited by examiner

*Primary Examiner*—Arthur G. Evans
(74) *Attorney, Agent, or Firm*—Fitzpatrick, Cella, Harper & Scinto

(57) ABSTRACT

To print plural copies of a document consisting of a plurality of pages by a printer, a host computer sandwiches print data with a spool command and a spool end command, and transmits the print data to the printer. The printer stores the received print data, sandwiched in between the spool command and spool end command, in a spool area. Then, the printer processes the print data stored in the spool area similarly to the processing of print data received directly from the host computer. Note that in this case, the printing operation is repeated the number of times corresponding to the number of copies of the document designated by the host computer. Accordingly, print data stored temporarily in the spool area can be used in similar manner to the print data transmitted directly from the host computer, for printing plural copies of the document.

21 Claims, 8 Drawing Sheets

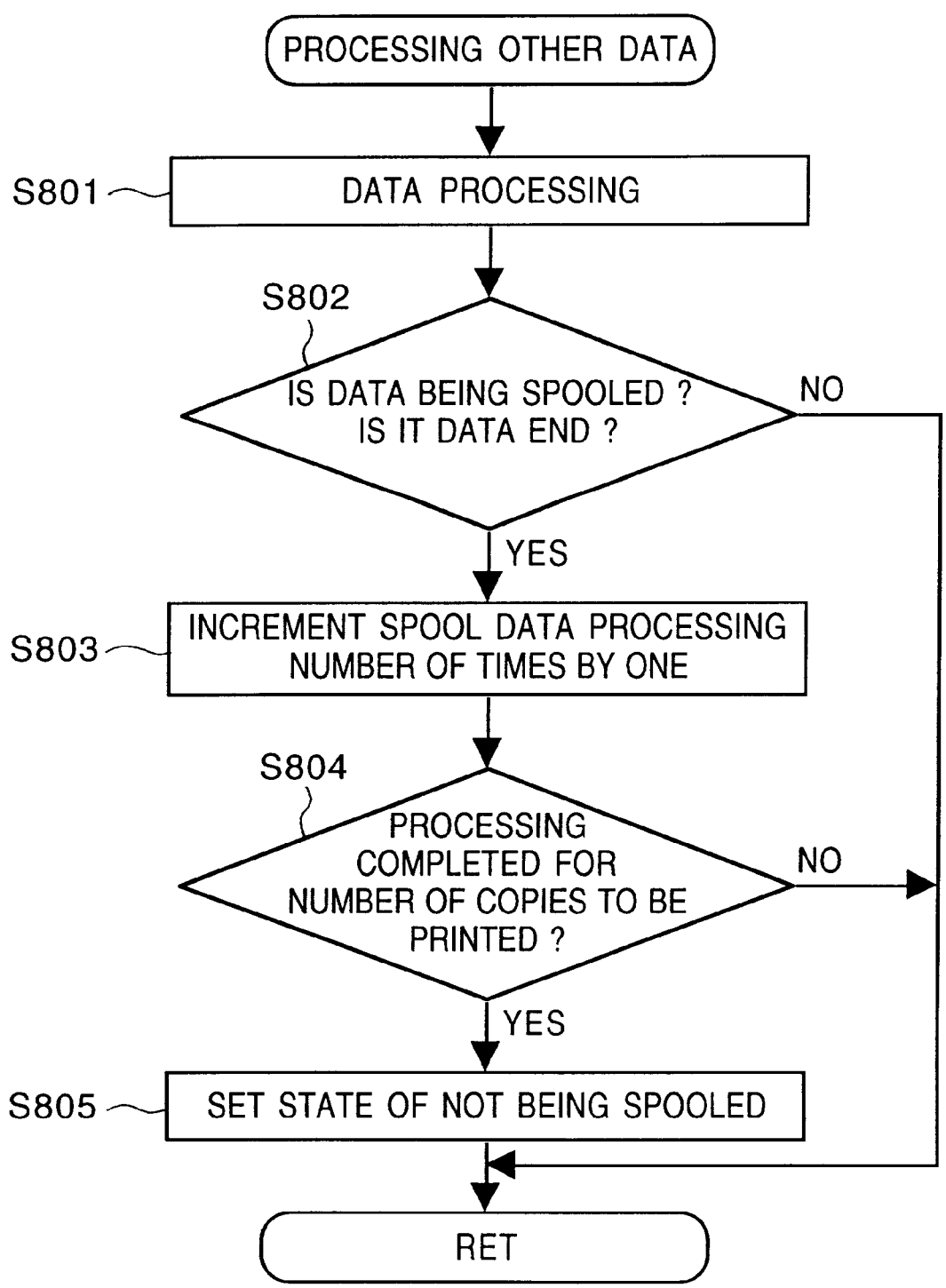

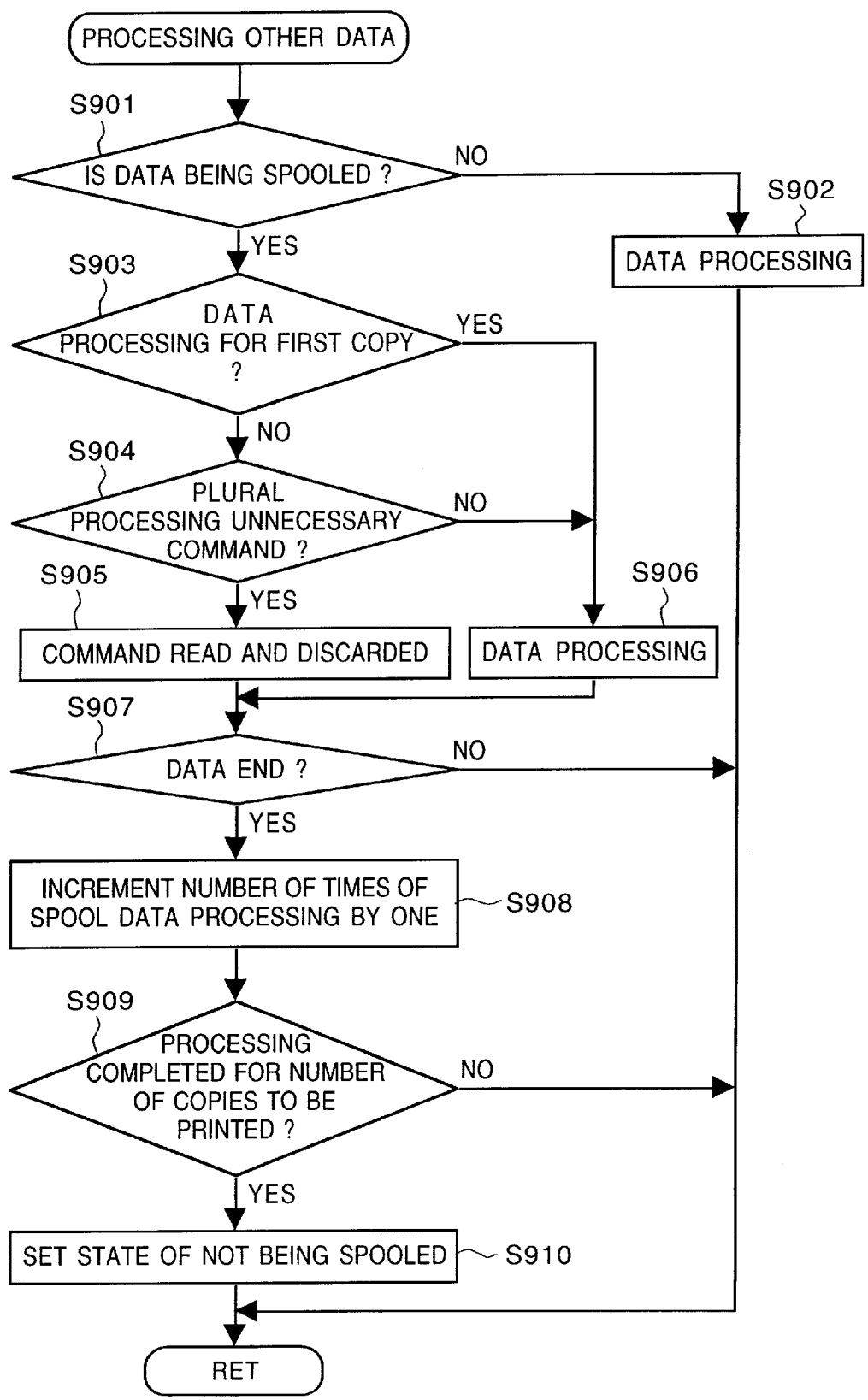

PRINTING APPARATUS AND PRINT CONTROL METHOD

BACKGROUND OF THE INVENTION

The present invention relates to a printing apparatus and print control method which enables e.g., a host computer, to designate a plurality of copies of a document having a plurality of pages to be printed.

When the number of copies of a document to be printed is designated, a conventional printing apparatus of this type consecutively prints out the designated number of one page and proceeds to the next page. In another conventional-type printing apparatus, image data where command interpretation has been performed is stored in a memory having a large capacity, then a plurality of copies of the document are printed by reading the image data out of the memory.

However, assuming a case where an operator designates the number of copies of a document to be printed by the aforementioned former-type printing apparatus, if the apparatus does not have a sorting function where receiving trays are moved every time a page is discharged so as to discharge each copy of the document to different receiving trays, the operator must manually collate the outputted pages into the designated number of copies of the document after printing is completed. Moreover, the printing apparatus of this type cannot automatically staple each copy of the document.

Further, there is a problem in the latter-type printing apparatus that the apparatus requires an extremely large memory capacity since the image data is stored in the form where commands are processed and developed.

Furthermore, in order to print a plurality of copies of the document, print data arranged in the page order is repeatedly transferred for a plural number of times. However in this method, in a case where the print data includes e.g., a command for permanently registering a font, the same font is repeatedly registered, wasting the memory capacity.

SUMMARY OF THE INVENTION

The present invention has been made in consideration of the above situation, and has as its object to provide a printing apparatus and print control method which can print a designated number of copies of a document consisting of a plurality of pages, based on received print data corresponding to one copy of the document, even in a case where a sorter is not provided or a case where a memory having a large capacity is not provided.

In order to attain the above object, the present invention has the following configuration. More specifically, a printing apparatus for printing a plurality of copies of a document in accordance with a command, comprises: receiving means for receiving print data and storing the received print data in a first memory portion; determining means for determining whether or not the print data received by the receiving means includes a command for printing a plurality of copies of a document, including print number data indicative of a number of copies of the document to be printed; data transferring means for transferring the received print data from the first memory portion to a second memory portion in a case where the command for printing the plurality of copies of the document is included; outputting means for printing an image based on the print data; and print control means for, in a case where the command for printing the plurality of copies of the document is not included, controlling the outputting means to perform printing by reading the data out of the first memory portion, and in a case where the command for printing the plurality of copies of the document is included, controlling the outputting means to perform printing for the number of copies specified by the print number data by reading the data out of the second memory portion.

Furthermore, the present invention provides a print control method for printing a plurality of copies of a document based on received data, received by reception means, in accordance with a command for printing the plurality of copies of the document, comprising: a receiving step of reading print data out of a spool memory in a case where data is stored in the spool memory, and in a case where data is not stored in the spool memory, reading the received data from the reception means; and an outputting step of storing the received data in the spool memory in a case where the data read in the receiving step includes a command for printing a plurality of copies of a document, and in a case where the data does not include the command for printing the plurality of copies of the document, the data read in the receiving step is used for printing, wherein in a case where the print data is stored in the spool memory, the receiving step and the outputting step are repeated in order to print a specified number of copies of the document.

Furthermore, the present invention provides a computer-readable memory storing print control programs for printing a plurality of copies of a document based on received data, received by reception means, in accordance with a command for printing the plurality of copies of the document, the programs make a computer function as: receiving means for reading print data out of a spool memory in a case where data is stored in the spool memory, and in a case where data is not stored in the spool memory, reading the received data from the reception means; and output processing means for storing the received data to the spool memory in a case where the data read by the receiving means includes the command for printing the plurality of copies of the document, and performing printing based on the data read by the receiving means in a case where the data does not include the command for printing the plurality of copies of the document, wherein in a case where the print data is stored in the spool memory, processing performed by the receiving means and the output processing means are repeated in order to print a specified number of copies of the document.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart showing detailed steps of a process routine for processing other commands in a printer according to the first embodiment; and FIG. 9 is a flowchart showing detailed steps of a process routine for processing other commands in a printer according to the second embodiment.

DETAILED DESCRIPTION OF THE PREFERRED EMBODIMENTS

Preferred embodiments of the present invention will be described in detail in accordance with the accompanying drawings.

[First Embodiment]

Figure 1:
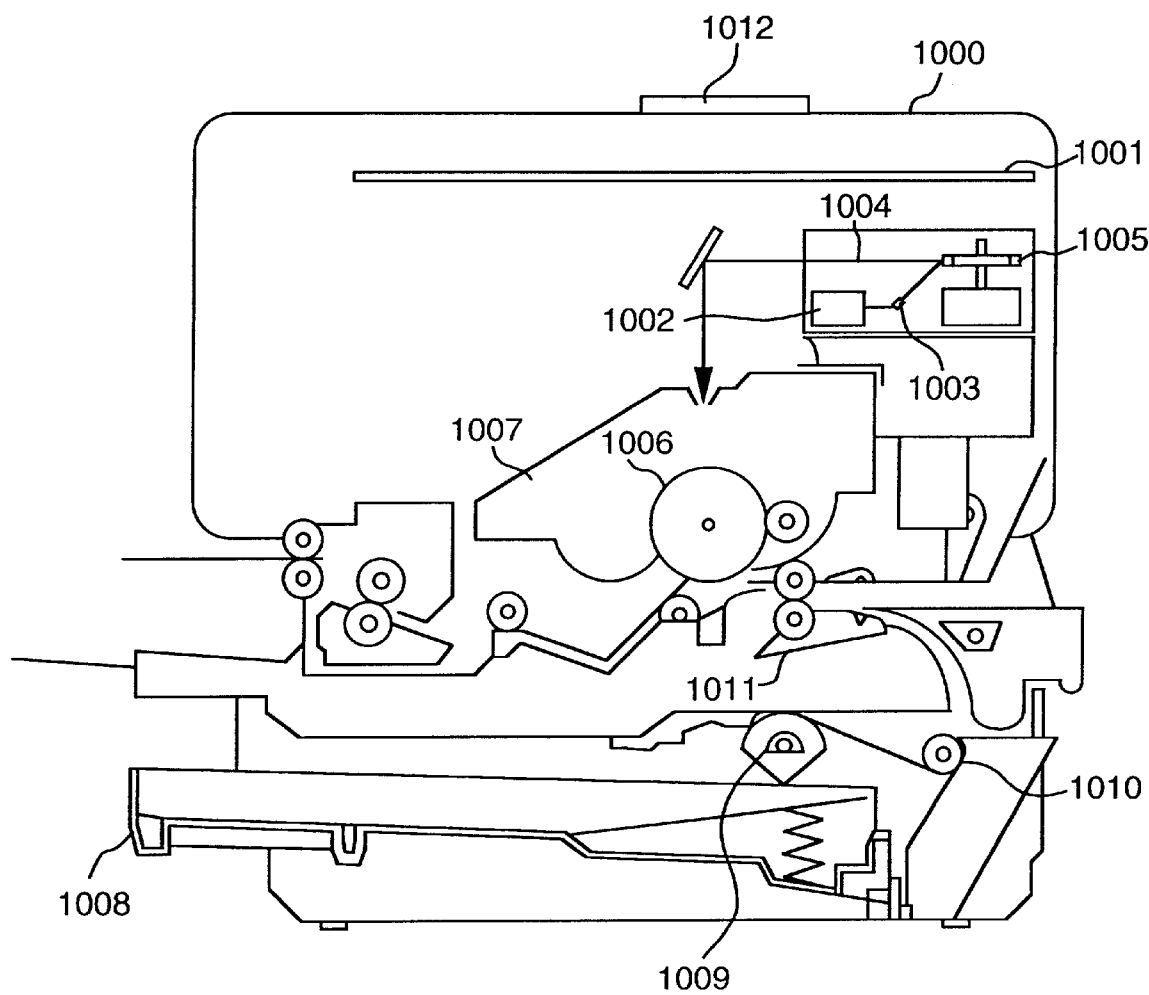
FIG. 1 is a cross-section view showing the internal structure of a laser beam printer (LBP)

FIG. 1 is a cross-section view showing the internal structure of a laser beam printer (hereinafter referred to as an LBP) according to the present embodiment. A data source e.g. a host computer (not shown), can register a character pattern or form data and the like in the LBP. In FIG. 1, the LBP main body 1000 receives and stores character data (character codes) or form data or macro commands supplied by an externally connected host computer (numeral 2000 in FIG. 2), generates corresponding character patterns or form patterns and the like based on the data, and forms an image on a sheet of paper serving as a print medium.

On an operation panel 1012, switches and an LED display unit and the like are provided for user operation. A printer control unit 1001 controls the entire LBP and interprets character data and the like supplied by the host computer. The control unit 1001 mainly converts character data into a video signal of the corresponding character pattern and outputs the video signal to a laser driver 1002. The laser driver 1002 is a circuit for driving a semiconductor laser 1003, and switches ON/OFF of a laser beam 1004 irradiated by the semiconductor laser 1003 in accordance with the inputted video signal. The laser beam 1004 is laterally shifted by a rotating polygon mirror 1005, thereby scanning over a electrostatic drum 1006. As a result, an electrostatic latent image of the character pattern is formed on the electrostatic drum 1006. The latent image is developed by a developing unit 1007, located peripherally to the electrostatic drum 1006, and transferred onto a print medium. Herein, a cut sheet is used as a print medium. A cut sheet paper, stacked in a paper cassette 1008 which is inserted in the LBP 1000, is fed into the apparatus by a paper feed roller 1009 and conveyance rollers 1010 and 1011 and supplied to the electrostatic drum 1006.

Figure 2:
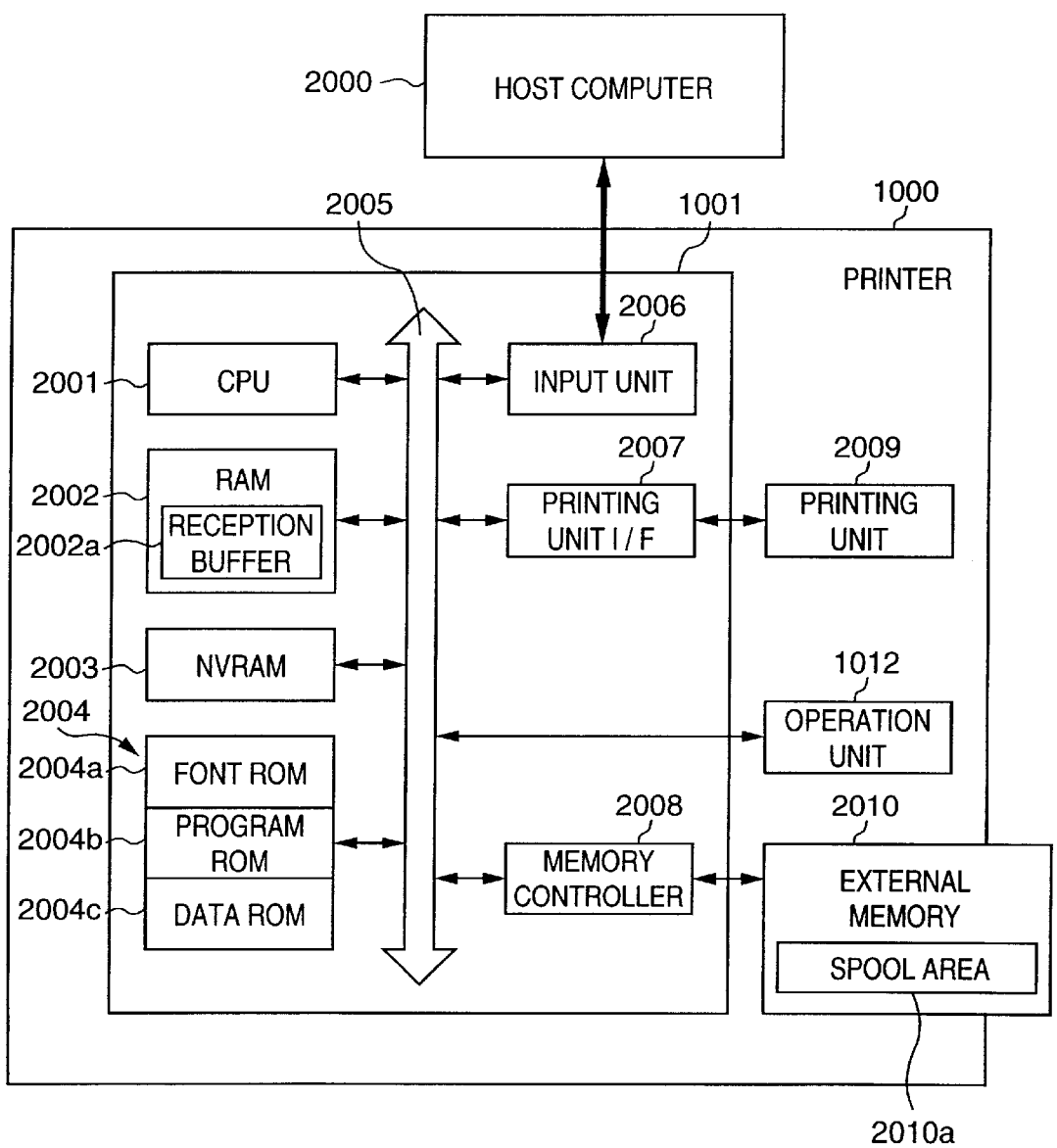
FIG. 2 is a block diagram showing the structure of a printer control system.

FIG. 2 is a block diagram showing the structure of a printer control system provided for describing the embodiment of the present invention. Herein, a description will be provided using the laser beam printer (FIG. 1) as an example. Note that as long as the function of the present invention is realized, the present invention is applicable to a single apparatus, or a system consisting of a plurality of apparatuses, or a system performing processing via network such as LAN. In FIG. 2, a host computer 2000 is connected to the printer 1000 via a predetermined interface (not shown).

In the printer 1000, a printer CPU 2001 integrally controls an access made by various devices connected to a system bus 2005 based on a control program stored in a program ROM 2004b of a ROM 2004, or a control program stored in an external memory 2010, and outputs image signals as output data to a printing unit (printer engine) 2009 connected via a printing unit interface 2007.

In the program ROM 2004b of the ROM 2004, control programs for the CPU 2001 such as those explained in flowcharts in FIGS. 3, 5 to 9 are stored. In a font ROM 2004a of the ROM 2004, font data (actual font) used for generating output data is stored. In a case of a printer not having an external memory 2010 such as hard disc, data used by the host computer is stored in a data ROM 2004c of the ROM 2004. The CPU 2001 is communicable with the host computer via an input unit 2006 so that information in the printer is notified to the host computer 2000. A RAM 2002 serves as a main memory or a work area of the CPU 2001, and its memory capacity can be extended by an optional RAM which is connected to an extension port (not shown). The RAM 2002 includes a reception buffer 2002a where print data inputted by the host computer is stored. An NVRAM 2003 is a nonvolatile RAM used as a storage area for storing environment data or characters defined by users.

A memory controller (MC) 2008 controls the aforementioned external memory 2010 e.g. hard disc (HD), an IC card and the like. The external memory 2010 is optionally connected. In addition, font data, emulation program, form data and the like may also be stored in the external memory. Note that the aforementioned external memory is not limited to one, but at least one or more external memories may be provided. In addition to an incorporated font, an optional font card and a plurality of external memories storing programs for interpreting a printer control language in a different language system may be connected. Further, in this embodiment, the external memory 2010 has a spool area 2010a which will be described later. The spool area 2010a may be provided in RAM 2002 or NVRAM 2003.

When the printer 1000 receives print data from the host computer 2000, the received data is temporarily stored in the reception buffer 2002a of the RAM 2002 (or external memory 2010). The received data is outputted by the procedure which will be described later.

Figure 3:
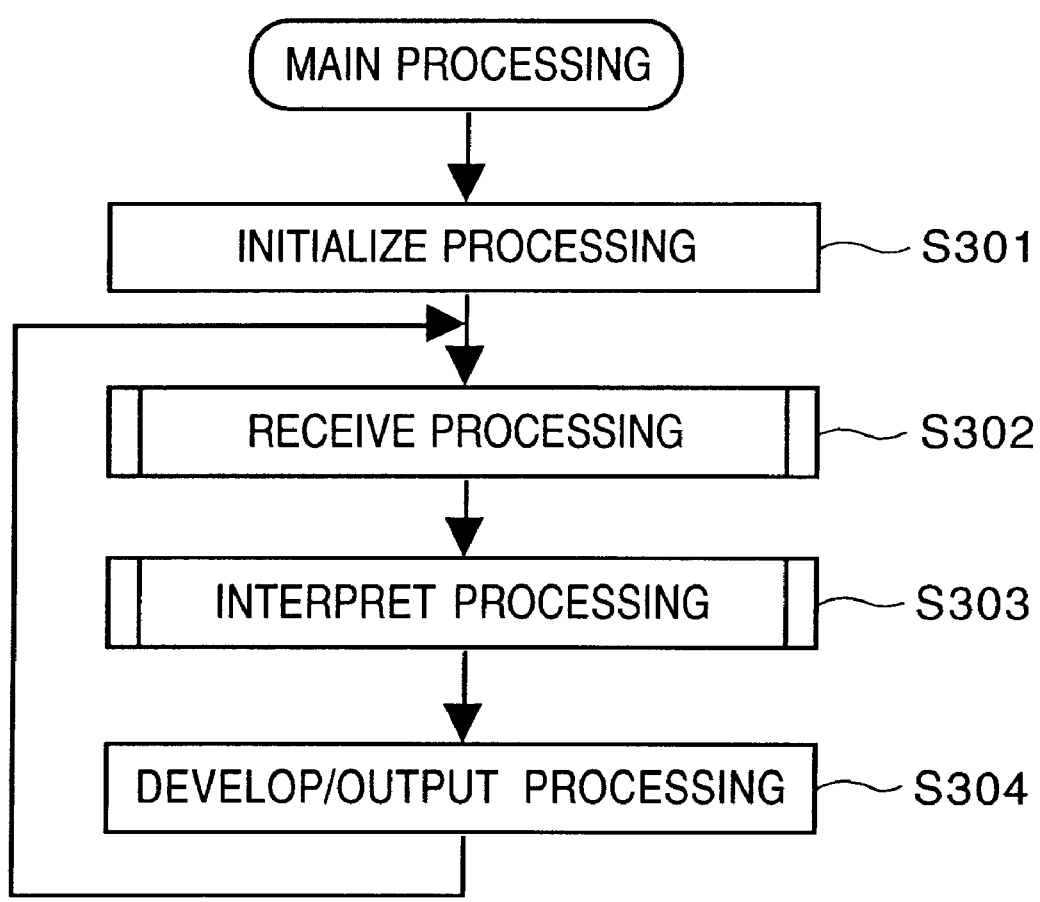
FIG. 3 is a flowchart showing the steps of main data processing.

FIG. 3 is a flowchart showing, as an example, the steps of main data processing in the printer of the present embodiment. Upon receiving data from the host computer, the printer of the present embodiment determines whether or not the data designates plural copies of printing. If so, the received data is transferred from the reception buffer 2002a to the spool area 2010a. Then, in the case of printing a plurality of copies of a document consisting of a plurality of pages, data is read out of the spool area 2010a instead of the reception buffer 2002a, and printing is performed. This process is repeated the number of times corresponding to the number of copies to be printed.

Referring to FIG. 3, first the printer is initialized (step S301). Upon receiving data, receiving processing is performed (step S302), and the received data is interpreted by an interpretation routine (step S303). Next, data development and output processing are performed (step S304), then the processing returns to the data receiving processing.

Figure 4:
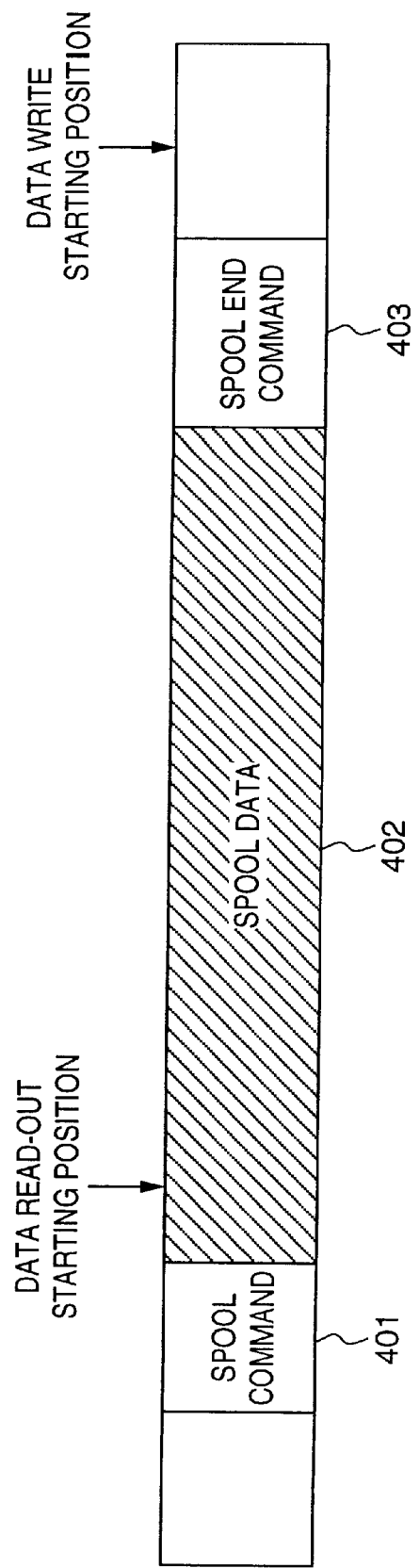
FIG. 4 is a conceptualized view of a reception buffer.

FIG. 4 is a conceptualized view showing, as an example, contents of the reception buffer of the printer according to the present embodiment. The reception buffer has a ring-buffer structure. When the buffer is read/written to the end, the reading/writing returns to the beginning of the buffer. Moreover, a read-out starting position and write starting position of data are respectively stored in pointers. At the time of reading/writing, the read pointer and write pointer are checked so that the read pointer does not overtake the write pointer or vice versa.

As shown in FIG. 4, spool data 402 is sandwiched in between a spool command 401 and a spool end command 403. When the printer interprets the spool command 401, the printer stores the following spool data 402 in the spool area 2010a of the external memory 2010 without further interpretation, besides the determination of whether or not the data is a spool end command, until the spool end command 403 is found. Note that the spool area may be secured in the RAM 2002. Although FIG. 4 shows a case where print data accompanied by the spool command is received, the present invention is capable of a printing operation based on print data not accompanied by a spool command. In this case, the spool command 401 and spool end command 403 sandwiching the spool data in FIG. 4 are not transmitted by the host computer. Therefore, received data is not stored in the spool area.

Figure 5:
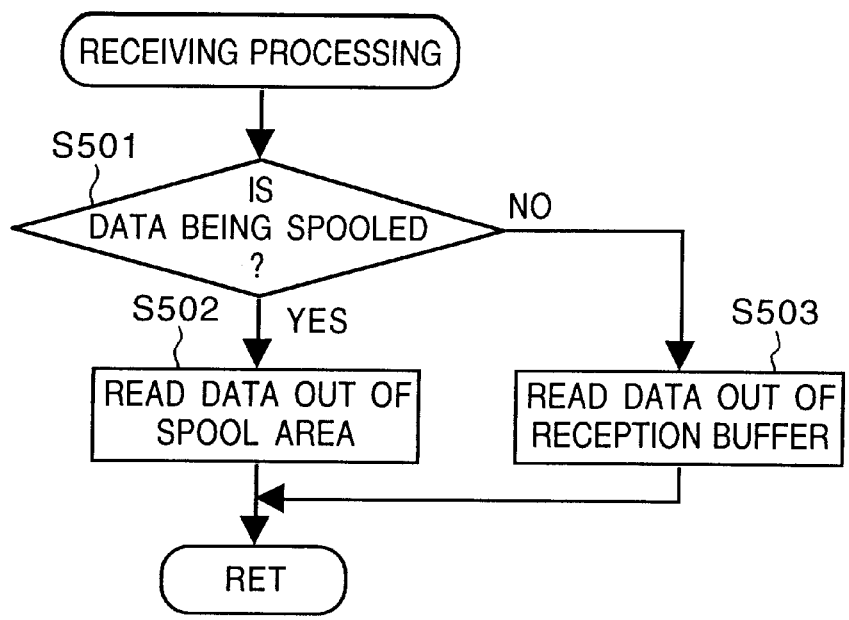
FIG. 5 is a flowchart showing detailed steps of a receiving process routine.

FIG. 5 is a flowchart showing, as an example, detailed steps of a receiving process routine of the printer according to the present invention. These steps correspond to step S302 in FIG. 3.

First, it is determined whether or not data is currently being spooled (step S501) by referring to an internal flag or a variable (hereinafter referred to as a spool flag) indicative of spool processing being performed, which is provided in the RAM 2002 or external memory 2010. Spool processing is to temporarily store received data in the spool area 2010a of the external memory 2010 (or RAM 2002) and output the print data stored in the spool area 2010a for the number of copies of the document designated by a host computer, according to the processing steps to be described later. If it is determined that data is currently being spooled, received data temporarily stored in the spool area 2010a of the external memory 2010 is read out (step S502). If data is not currently being spooled, received data is read out of the reception buffer 2002a (step S503).

Figure 6:
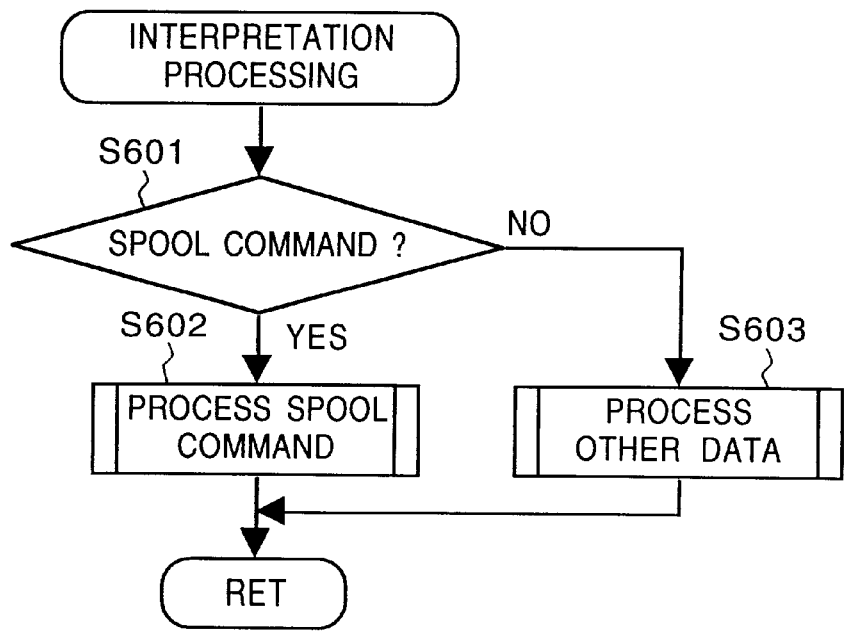
FIG. 6 is a flowchart showing detailed steps of a data interpretation process routine.

FIG. 6 is a flowchart showing, as an example, detailed steps of a data interpretation process routine in the printer of the present invention. These steps correspond to step S303 in FIG. 3.

First, it is determined whether or not the received data read out in step S302 is a spool command (step S601). The spool command is a command instructing to temporarily store received data in the spool area 2010a of the external memory 2010 and print out the number of copies of the document designated by the host computer. The spool command is added to print data when printing plural number of copies of the document and transmitted to the printer by the host computer. As a result of determination in step S601, if the received data is a spool command, the spool command is processed (step S602); and if it is not a spool command, processing for other commands (e.g., command described in page description language and the like) is performed (step S603).

Figure 7:
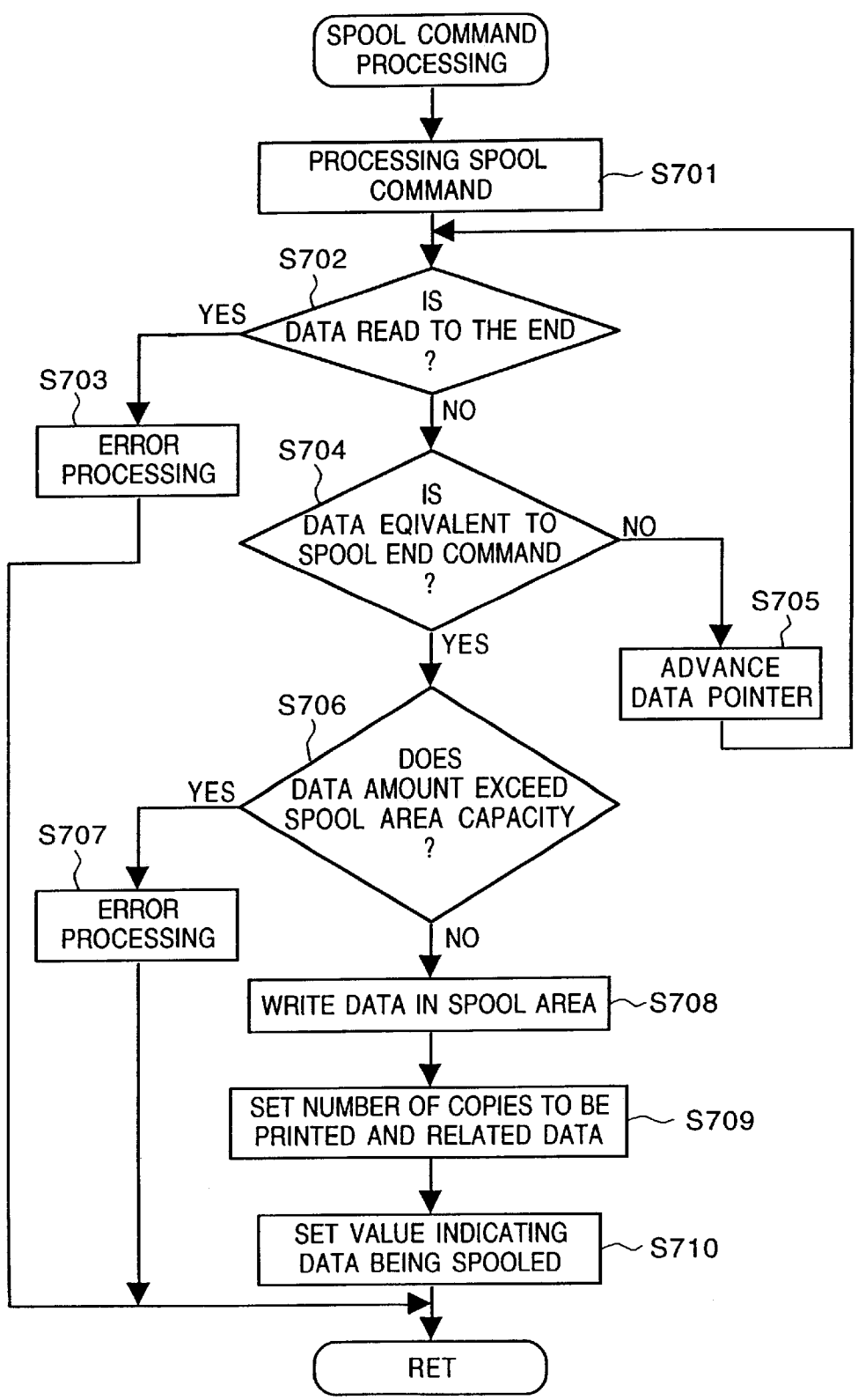
FIG. 7 is a flowchart showing detailed steps of a spool command process routine.

FIG. 7 is a flowchart showing, as an example, detailed steps of a spool command process routine in the printer according to the present invention. These steps correspond to step S602 in FIG. 6, and are for writing the print data following the spool command which is stored in the reception buffer, in the spool area.

First, processing is performed on the spool command (step S701). It is assumed herein that the spool command includes the number of copies to be printed which is designated by a host computer, and a character string indicative of the end of data for spool processing, i.e. data related to spool-end command. Therefore, processing on the spool command includes interpretation of these data. These data accompanying the spool command are stored in the RAM 2002 or external memory 2010. Moreover, in order to find data in the reception buffer 2002a in the subsequent processing, a read-out starting position in the reception buffer 2002a is set in a read pointer provided in the RAM 2002. Data indicated by the read pointer is referred to as the data of interest.

Next, it is determined whether or not the received data stored in the reception buffer 2002a is read to the end (step S702). This can be determined by, for instance, comparing the read pointer with a write pointer. Note that since the reception buffer 2002a is a ring buffer, if writing data is performed slower than reading data, the read pointer would catches up with the write pointer. In order not to determine this case as the data end, a signal indicative of data being received is also checked in addition to the comparison of the pointers in step S702. In this case, if data is being received, determination of data end will not be made despite the result of comparison of pointers. Note that the spool command itself is not written in the spool area 2010a, but is only read out of the reception buffer. Thus, processing on the spool command is performed on the data stored in the reception buffer 2002a.

As a result of determination in step S702, if all data in the reception buffer is read out, since there is no spool end command, necessary error processing is performed (step S703) and the processing ends. As a result of determination in step S702, if there is still received data to be read, it is determined whether or not the data of interest is a spool end command (step S704). Data related to the spool end command is stored in the RAM 2002 or external memory 2010 in step S701, and the determination of the spool-end command is made based upon this data. If it is determined in step S704, that the data of interest is not equivalent to the spool end command, the read pointer is advanced to the next data and the processing returns to step S702 (step S705). Note that at this stage, a data start address is stored in preparation for transferring data which will be executed later.

If it is determined in step S704 that the data of interest is equivalent to the spool end command, determination is made as to whether or not the data amount read out of the reception buffer 2002a exceeds the capacity of the spool area 2010a (step S706). If it exceeds, data is read and discarded, and error processing (step s707) e.g. displaying an error message on the operation panel 1012 is performed, and the interpretation processing in FIG. 7 ends. As a result of determination in step S706, if the data amount does not exceed the capacity of spool area 2010a, data stored in the reception buffer 2002a, excluding the spool command and spool end command, is written in the spool area 2010a (step S708). In addition, the data related to the number of copies to be printed or data related to the spool area, obtained in step S701 is stored in the RAM 202 or external memory 2010 (step S709). Then, the spool flag is set in a value indicative of data being spooled (step S710) and the processing ends.

FIG. 8 is a flowchart showing, as an example, detailed steps of a data interpretation process routine in a case where the data read out in step S302 is a command other than the spool command. By these steps, print data transmitted by the host computer without being accompanied by a spool command, or print data which has been transferred to the spool area by the steps shown in FIG. 7, are printed. These steps correspond to the step s603 in FIG. 6.

First, processing is performed on the data (step S801). Herein, processing according to the data is performed. For instance, in a case of a command describing an object in a page description language, the command is interpreted and an intermediate code is generated. Next, determination is made as to whether or not data is being spooled by referring to a spool flag, in addition to whether or not it is the data end (step S802). If data is not being spooled, or even if data is being spooled, if it is not the data end, the processing ends. Herein, the data end denotes when all spooled data is processed in step S801. If it is not the data end, the subsequent processing is performed by returning to step S302.

If it is determined in step S802 that data is being spooled and it is the data end, the data processing number of times stored in a memory area such as RAM 2002 or external memory 2010 and the like by the spool command is incremented by one (step S803). The data processing number of times correspond to the number of copies processed. Then, the data processing number of times incremented by one in step S803 is compared with the number of copies to be printed designated by the host computer, stored in the RAM 2002 or external memory 2010 in step S701 (step S804). If the processing for the designated number of copies to be printed is not completed as a result of comparison, the processing in FIG. 8 ends. If the processing for the designated number of copies to be printed is completed, the state of the spool flag is changed to a state of not being spooled (step S805).

By the above-described processing, in a case where data transmitted by a host computer is subjected to spool processing, the received data is temporarily transferred from the reception buffer to the spool area, and the data in the spool area is repeatedly used for printing the designated number of copies of the document. Because the data transferred to the spool area is the data stored in the reception buffer, the data processing steps are the same as the steps for printing only one copy of the document. Accordingly, the spool area can be kept small, and data corresponding to only one copy of the document can be transmitted by the host computer. In addition, since the designated number of copies of the document is printed by each copy, the printed copies of document are in the proper page order even if the printer does not have a sorter. Therefore, cumbersome operation of collating the printed pages is no longer necessary.

Moreover, since the reception buffer is emptied after data is transferred to the spool area, the next print job can be received immediately.

Furthermore, depending on whether or not data is being spooled, i.e. whether or not printing is performed for a plurality of copies of the document, the reception processing is controlled such that data is read out either from the reception buffer or from the spool area. Accordingly, a plurality of copies of the document can be printed without performing control by a module which processes the print command for printing a plurality of copies.

[Second Embodiment]

FIG. 9 is a flowchart showing, as an example, detailed steps of the data interpretation process routine for processing data other than a spool command by a printer according to the second embodiment of the present invention. More specifically, the printer of the second embodiment performs processing by the steps shown in FIG. 9 in place of the steps shown in FIG. 8 described in the first embodiment, and other structure of the printer is identical to that of the first embodiment Referring to FIG. 9, first it is determined whether or not data is being spooled by referring to a spool flag (step S901). If data is not being spooled, data processing is performed (step S902) and the processing ends. If it is determined in step S901 that data is being spooled, determination is made as to whether or not the current processing is for the first copy of the document subjected to printing (step S903); if so, the normal data processing is performed (step S906). Herein, the normal data processing is the same as that in step S801 in FIG. 8.

If it is determined in step S903 that the current processing is not for the first copy of the document, determination is made as to whether or not the data subjected to processing is a command in which the same data does not need to be processed a plural number of times. Such command, in which the same data does not need to be processed a plural number of times, is a command for e.g. permanently registering a font. If such command is processed a plural number of times, the same font would be registered many times, wasting the memory capacity. Thus, even in a case where printing is performed for a plurality of copies of the document, such command should be performed only once while the first copy of the document is being processed. Therefore, in step S904, it is determined whether or not the received data is such command by referring to a list of such commands stored in the program ROM 2004b in advance.

If it is determined in step S904 that the received data is not the above-described command which does not need to process the same data a plurality of number of times, the normal data processing is performed (step S906); and if the data is the above-described command, the command is read and discarded (step S905). Next, whether or not it is the data end is determined (step S907); and if it is not the data end, the processing ends. If it is determined in step S907 that it is the data end, the number of times of data processing stored in a storage area such as RAM 2002 or external memory 2010 is incremented by one (step S908). Then, the number of times of data processing is compared with the number of copies to be printed designated by the host computer, stored in step S701 (step S909). If data processing for the designated number of copies to be printed is not completed as a result of the comparison, the processing in FIG. 9 ends. If data processing for the designated number of copies to be printed is completed, the state of the spool flag is changed to a state of not being spooled (step S910).

In the processing shown in FIG. 9, steps S801 and S802 in FIG. 8 are substituted with steps S901 to S907. By these steps, processes which do not need to be repeated is performed only while processing for the first copy of the document is performed.

Note that in the printer according to the first and second embodiments, the end of data temporarily stored in the RAM 2002 or external memory 2010 for printing a plurality of copies of the document is determined by the spool end command. However, the amount of data stored may be specified by the spool command in advance, and the end of data may be determined by counting the data amount.

In the printer according to the present invention, a step may be added after step S805 in FIG. 8 or step S910 in FIG. 9, to delete data temporarily stored in the RAM 2002 or external memory 2010 for printing a plurality of copies of the document, thereby efficiently using the memory area.

Furthermore, in the printer according to the present invention, an identifier may be assigned to the data temporarily stored in the RAM 2002 or external memory 2010 for printing a plurality of copies of the document, so that the data can be later used for printing the document again by designating the identifier of the stored data and specifying the number of copies to be printed by the host computer. The identifier may be designated by the host computer, or if the printer and the host computer are connected via a bi-directional interface, the identifier may be designated by the printer and the designated identifier is notified to the host computer. In either case, the identifier is stored in the RAM 2002 or external memory 2010 in correspondence with a spool area, when data is transferred from the reception buffer to the spool area.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a nonvolatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As set forth above, according to the present invention, received data is stored in a memory without further processing and used for the processing for printing a designated number of copies of the document. By virtue of this, even if the printer does not have a large capacity of memory or a sorter, the printer can output each copy of the document in the consecutive order for the designated number of copies, instead of continuously printing each page of the document for the designated number of copies. Accordingly, a sorter is not necessary. In addition, cumbersome operation of collating pages can be eliminated. Moreover, the amount of communication between a host computer and a printer can be reduced as compared to a case of sending the same data from the host computer to the printer for the necessary number of copies.

The present invention is not limited to the above embodiments and various changes and modifications can be made within the spirit and scope of the present invention. Therefore, to appraise the public of the scope of the present invention, the following claims are made.

What is claimed is:

1. A printing apparatus for receiving print data and printing a plurality of copies of a document in accordance with a command, comprising:

storage means for storing received print data in a first memory portion or a second memory portion in accordance with a command included in the print data;

outputting means for printing an image based on the print data; and print control means for, in a case where the command for printing the plurality of copies of the document is not included, controlling said outputting means to perform printing by reading the data out of the first memory portion, and in a case where the command for printing the plurality of copies of the document is included, controlling said outputting means to perform printing for the number of copies specified by the command by reading the data from the second memory portion.

2. The printing apparatus according to claim 1, wherein when the print data is read out for the second and more copies of printing, if the print data stored in the second memory portion includes data where a single time of processing is sufficient, said print control means does not perform processing of the data.

3. The printing apparatus according to claim 1, further comprising:

a third memory portion for storing an identifier added to the print data stored in the second memory portion; and designating means for designating data corresponding to the identifier, wherein said print control means controls said outputting means to output the specified number of copies of the document based on the data designated by said designating means.

4. A print control method for receiving print data and printing a plurality of copies of a document based on received data in accordance with a command for printing the plurality of copies of the document, comprising:

a storing step of storing received print data in a first memory portion or a second memory portion in accordance with a command included in the print data;

a printing control step of, in a case where a command for printing a plurality of copies of a document is not included, controlling said outputting step to perform printing by reading the data out of the first memory portion, and in a case where the command for printing the plurality of copies of the document is included, controlling said outputting step to perform printing for the number of copies specified by the command by reading the data from the second memory portion.

5. The print control method according to claim 4, wherein when the print data is read out for the second and more copies of printing, if the print data stored in the spool memory includes data where a single time of processing is sufficient, the data is not processed in said outputting step.

6. The print control method according to claim 4, further comprising a designating step of designating data corresponding to an identifier, wherein in said receiving step, the identifier added to the print data stored in the spool memory is stored in a second memory, and in said outputting step, the specified number of copies of the document is outputted based on the data designated in said designating step.

7. A computer-readable memory storing print control programs for receiving print data and printing a plurality of copies of a document based on received data in accordance with a command for printing the plurality of copies of the document, said programs comprising:

storing code means for storing received print data in a first memory portion or a second memory portion in accordance with a command included in the print data;

outputting code means for printing an image based on the print data; and printing control code means for, in a case where the command for printing the plurality of copies of the document is not included, controlling said outputting code means to perform printing by reading the data out of the first memory portion, and in a case where the command for printing the plurality of copies of the document is included, controlling said outputting code means to print the number of copies specified by the command by reading the data out of the second memory portion.

8. The computer-readable memory according to claim 7, wherein when the print data is read out for the second and more copies of printing, if the print data stored in the spool memory includes data where a single time of processing is sufficient, said output processing means does not perform processing of the data.

9. The computer-readable memory according to claim 7, further comprising designating means for designating data corresponding to an identifier, wherein said receiving means stores in a second memory the identifier added to the print data stored in the spool memory, and said output processing means outputs the specified number of copies of the document based on the data designated by said designating means.

10. The printing apparatus according to claim 1, wherein said storage means includes first storage means for storing the received data in the first memory portion and second storage means for storing the print data, stored in the first memory portion in the second memory portion.

11. The printing apparatus according to claim 10, further comprising determination means for determining whether or not the print data includes the command for printing a plurality of copies of a document, wherein said second storage means stores the print data, stored in the first memory portion, in the second memory portion when the print data is determined to include the command for printing the plurality of copies of the documents.

12. The printing apparatus according to claim 1, wherein the command for printing the plurality of copies of the document indicates the number of copies to be printed, and said printing control means controls said outputting means to print the number of copies of the document indicated by the command, by reading the print data from the second memory portion.

13. The printing apparatus according to claim 1, wherein a command for registering a font included in the print data is not processed after the first copy of the document has been printed.

14. The print control method according to claim 4, wherein said storing step includes a first storage step for storing the received data in the first memory portion and a second storage step for storing the print data, stored in the first memory portion in the second memory portion.

15. The print control method according to claim 14, further comprising a determination step for determining whether or not the print data includes the command for printing a plurality of copies of a document, wherein said second storage step stores the print data, stored in the first memory portion, in the second memory portion when the print data is determined to include the command for printing the plurality of copies of the documents.

16. The print control method according to claim 4, wherein the command for printing the plurality of copies of the document indicates the number of copies to be printed, and said printing control step controls said outputting means to print the number of copies of the document indicated by the command, by reading the print data from the second memory portion.

17. The print control method according to claim 4, wherein a command for registering a font included in the print data is not processed after the first copy of the document has been printed.

18. The computer-readable memory according to claim 7, wherein said storing code means includes a first storage code means for storing the received data in the first memory portion and second storage code means for storing the print data, stored in the first memory portion in the second memory portion.

19. The computer-readable memory according to claim 18, further comprising determination code means for determining whether or not the print data includes the command for printing a plurality of copies of a document, wherein said second code storage means stores the print data, stored in the first memory portion, in the second memory portion when the print data is determined to include the command for printing the plurality of copies of the documents.

20. The computer-readable memory according to claim 7, wherein the command for printing the plurality of copies of the document indicates the number of copies to be printed, and said printing control code means controls said outputting code means to print the number of copies of the document indicated by the command, by reading the print data from the second memory portion.

21. The computer-readable memory according to claim 7, wherein a command for registering a font included in the print data is not processed after the first copy of the document has been printed.

* * * * *

UNITED STATES PATENT AND TRADEMARK OFFICE
CERTIFICATE OF CORRECTION

PATENT NO. : 6,175,426 B1
DATED : January 16, 2001
INVENTOR(S) : Shigeki Hirooka It is certified that error appears in the above-identified patent and that said Letters Patent is hereby corrected as shown below:

Column 1,
Line 6, "enables e.g.," should read -- enables, e.g., --; and
Line 35, "includes e.g.," should read -- includes, e.g., --.

Column 2,
Line 47, "a preferred embodiment" should read -- preferred embodiments --;
Line 50, "an example" should read -- examples, -- and "example" should read -- examples, --;
Line 51, "is" should read -- are --;
Line 53, "follows" should read -- follow --; and
Line 61, "cross-section" should read -- cross-sectional --.

Column 3,
Line 22, "cross-section" should read -- cross-sectional; and
Line 45, "a" should read -- an --.

Column 6,
Line 15, "catches" should read -- catch --;
Line 45, "s707)" should read S707), --; and
Line 64, "s603" should read -- S603 --.

Column 7,
Line 40, "of" should read -- of the --; and
Line 61, "other" should read -- another --.

Column 9,
Line 43, "the processing for" should be deleted.

Column 10,
Line 33, "data;" should read -- data; and --.

Column 11,
Line 30, "portion" should read -- portion, --.

UNITED STATES PATENT AND TRADEMARK OFFICE
CERTIFICATE OF CORRECTION

PATENT NO. : 6,175,426 B1
DATED : January 16, 2001
INVENTOR(S) : Shigeki Hirooka It is certified that error appears in the above-identified patent and that said Letters Patent is hereby corrected as shown below:

Column 12,
Lines 5 and 27, "portion" should read -- portion, --.

Signed and Sealed this

Eleventh Day of December, 2001

Attest:

NICHOLAS P. GODICI
*Attesting Officer*     *Acting Director of the United States Patent and Trademark Office*